US005509484A

United States Patent [19]
Landi et al.

[11] Patent Number: 5,509,484
[45] Date of Patent: Apr. 23, 1996

[54] HORSESHOE IMPACT PAD

[75] Inventors: Curtis L. Landi; Susan L. Wilson, both of Sunnyvale, Calif.

[73] Assignee: Supracor Systems, Inc., Sunnyvale, Calif.

[21] Appl. No.: 370,970

[22] Filed: Jan. 10, 1995

[51] Int. Cl.$^6$ .................................................. A01L 7/02
[52] U.S. Cl. .................................................. 168/14; 168/28
[58] Field of Search .................................. 168/12, 14, 26, 168/28, DIG. 1

[56] References Cited

U.S. PATENT DOCUMENTS

| 1,702,882 | 2/1929 | Tweed | 168/12 |
| 3,180,421 | 4/1965 | Hirshberg et al. | 168/12 |
| 4,823,883 | 4/1989 | Colonel et al. | 168/12 |

FOREIGN PATENT DOCUMENTS

| 2641942 | 7/1990 | France | 168/28 |

Primary Examiner—Robert P. Swiatek
Attorney, Agent, or Firm—Claude A. S. Hamrick

[57] ABSTRACT

An improved horseshoe shock-absorbing impact pad for horses including a generally oval-shaped panel truncated on one side to have an outer perimeter configured to correspond to the hoofprint of a horse. The panel is made of a relatively firm, resilient material, and includes a honeycomb-configured core having a first sheet of resilient material bonded to one face of the core and a second sheet of resilient material bonded to the opposite face of the core to form a plurality of hermetically sealed cells. The core comprises bonded together first and second regions. The first region having a plurality of strips of thermoplastic material having a first stiffness characteristic, bonded together along a plurality of first bond joints to form a plurality of contiguous regular shaped cells. The second region similarly having a plurality of strips of thermoplastic material having a second stiffness characteristic, bonded together along a plurality of second bond joints to form a plurality of contiguous regular shaped cells. Each of the first and the second bond joints forming a forming a first and a second bond row, respectively. Each of the first and the second bond rows disposed parallel to each other and disposed perpendicular to a longitudinal axis of the panel. When the pad is placed between a horseshoe and horse's hoof the pad tends to absorb a substantial part of the shock energy that would otherwise be transmitted to the hoof.

26 Claims, 11 Drawing Sheets

HORSESHOE IMPACT PAD

BACKGROUND OF THE INVENTION

1. Field of the Invention

The present invention relates generally to energy-absorbing pads for interposition between a conventional metal horseshoe and a horse's hoof, and more particularly to an improved pad of the type described which includes a flexible honeycomb panel having at least two regions, each region constructed from resilient materials having different durometers.

2. Description of the Prior Art

It has for some time now been the practice to place resilient pads between a horse's hoof and the horseshoe to absorb some of the shock and concussion that is experienced by the unprotected portion of the hoof as it meets the ground or pavement. It is also known to provide various "frog pads" in the central portion of the hoof for therapeutic purposes.

One prior art horseshoe pad is disclosed in the U.S. Pat. No. 4,513,825 to Murphy and is directed to a horseshoe "full" pad made of an energy-absorbing micro-cellular urethane foam having a tough outer skin. The pad is characterized by having a central layer or sheet which covers and can be trimmed to the hoof. Stabilizer bars and heel shock-reducers are mounted into the turf-engaging surface of the pad and rise to about the level of the horseshoe so that they, along with the shoe, take up and absorb some of the shock. A frog pad may also be molded into the hoof-engaging surface of the pad to further protect and stimulate the soft tissue of the hoof.

Since the landing force of a horse is usually four to five times its weight, reducing concussion from an impacting horse hoof onto the ground is not easy to accomplish in a predictable manner, especially in animals which may weigh 1000 pounds or more. Prior to Murphy, most prior art hoof pads were either hard and made of material such as leather, or soft throughout the entire pad and made of nonformed rubber. If it were hard, the pad did not adequately cushion, and it if were soft, the pad did not last. In the Murphy pad, a tough durable outer surface was combined with a soft cushioning interior which, when combined with the functional frog pad and heel shock-reducer, together with central stabilizing bars, yielded improved functional performance.

Another prior art horseshoe pad is disclosed in the U.S. Pat. No. 5,289,878 to Landi et al. and is directed to a horseshoe impact pad having a resilient honeycomb panel. The pad includes a molded base of urethane material having a recess formed in an upper or hoof-engaging surface thereof. A resilient honeycomb panel is disposed within the recess and is fixedly secured to the molded base. The honeycomb panel includes a core having a plurality of elastomeric ribbons intermittently bonded and then expanded to form a cellular network. Each ribbon is substantially identical in durometer. The pad may be of full design, or may be generally limited to the hoof area covered by the horseshoe itself. The hoof-engaging surface of the pad may also be configured to include a frog support component. The turf-engaging surface of the pad may be provided with stabilizing ribs, heel shock-reducing projections, etc., and the base may be tapered to provide a desired tilt to the animal's hoof.

Applicants have found that substantial improvements in performance can be obtained if a honeycomb panel used in the horseshoe pad, includes a plurality of regions constructed from resilient materials having different durometers.

SUMMARY OF THE INVENTION

It is therefore a principal object of the present invention to provide a lightweight horseshoe pad having improved shock-absorbing characteristics.

Another object of the present invention is to provide an improved horseshoe pad of the type described utilizing honeycomb configured shock-absorbing materials.

Still another object of the present invention is to combine a honeycomb panel with a molded or cast base material to obtain the anisotropic load cushioning benefits of the honeycomb panel, while at the same time providing superior load distribution so as to avoid injury to the soft tissue of the hoof.

Yet still another object of the present invention is to provide an improved horseshoe pad of the type described, including a plurality of regions each region being constructed from resilient materials having different durometers.

Briefly, an improved horseshoe shock-absorbing impact pad for horses includes a generally oval-shaped panel truncated on one side to have an outer perimeter configured to correspond to the hoofprint of a horse. The panel is made of a relatively firm, resilient material, and includes a honeycomb-configured core having a first sheet of resilient material bonded to one face of the core and a second sheet of resilient material bonded to the opposite face of the core to form a plurality of hermetically sealed cells. The core includes a plurality of strips of thermoplastic resilient material bonded together to form a plurality of contiguous regular shaped cells. The core includes a first region, and a second region. The first region includes a plurality of strips having a first stiffness characteristic, bonded together along a plurality of first bond joints. The second region similarly includes a plurality of strips having a second stiffness characteristic, bonded together along a plurality of second bond joints. Each of the first and the second bond joints defines a first bond row and a second bond row, respectively. Each of the bond rows is disposed parallel to each other and is disposed perpendicular to the longitudinal axis of the panel. When the pad is placed between a horseshoe and horse's hoof the pad tends to absorb a substantial part of the shock energy that would otherwise be transmitted to the hoof.

An important advantage of the present invention is that it provides a lightweight hoof pad that is highly effective in absorbing impact energy, yet does not interfere with the normal functional relationship between horseshoe and hoof.

Another advantage of the present invention is that it provides an improved shock-absorbing protective padding for the soft central portion of the hoof to prevent injury thereto.

Still another advantage of the present invention is that it can be configured in numerous ways to provide various advantageous shock-reducing and therapeutic pad configurations.

These and other objects and advantages of the present invention will no doubt become apparent to those skilled in the art after having read the following detailed description of the preferred embodiments which are illustrated in the several figures of the drawing.

DETAILED DESCRIPTION OF THE PREFERRED EMBODIMENT

Figure 1:
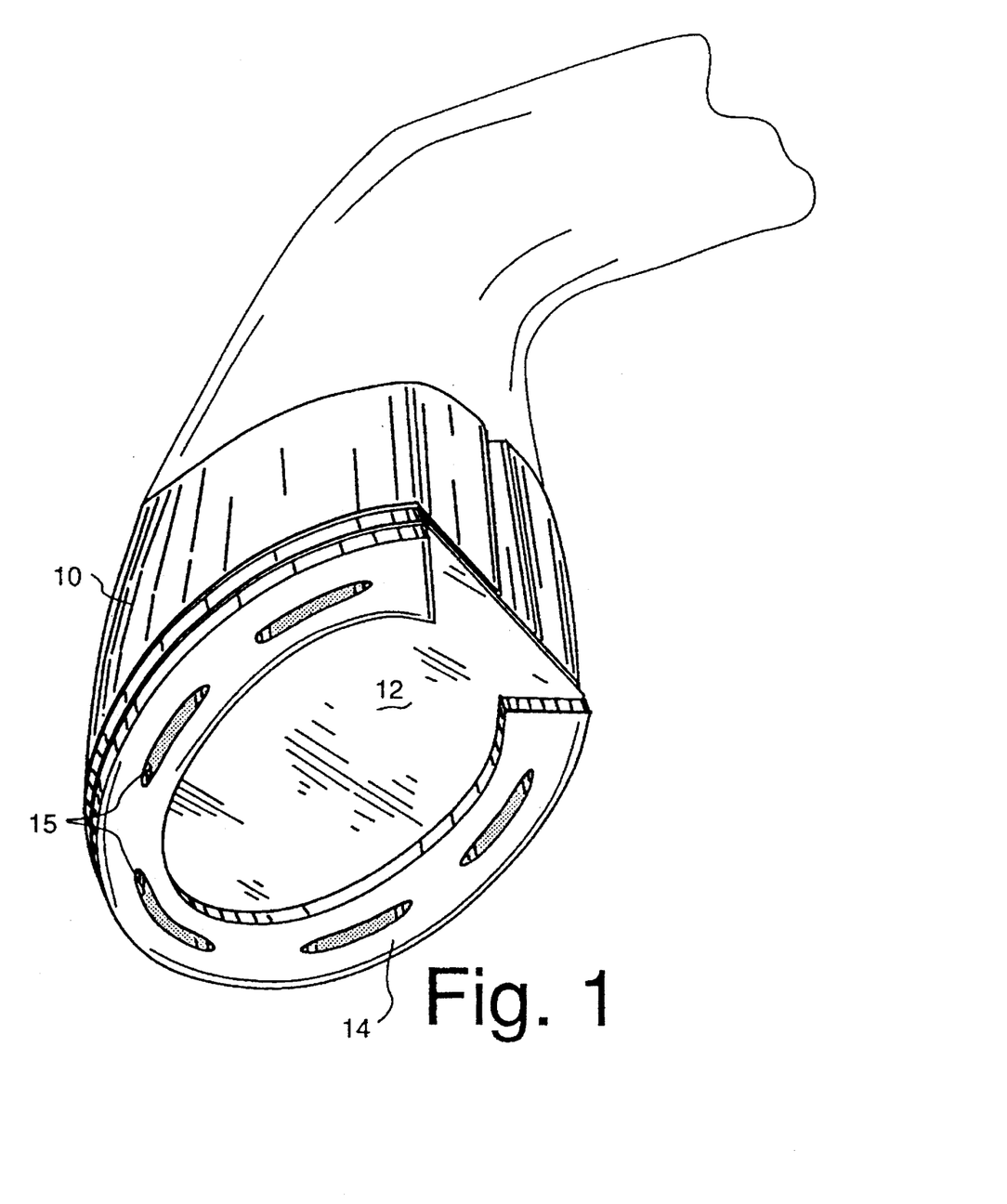
FIG. 1 is a perspective view of a horse hoof showing a full energy-absorbing horseshoe pad in accordance with the present invention interposed between the hoof and horseshoe.

Referring to FIG. 1 of the drawing, a hoof of a horse is shown at 10, having a full pad 12 in accordance with the present invention disposed between the hoof and a horseshoe 14. As in the case of prior pads, the pad 12 is positioned between hoof and horseshoe during the shoeing process, and is secured in place by horseshoe nails (not shown) which are normally driven through the horseshoe slots 15 and through the pad 12 into the perimeter of the hoof 10. After the pad and shoe are affixed to the hoof, the outer edges of the pad are trimmed with a knife or file to provide a smooth surface joining hoof and shoe.

Figure 2:
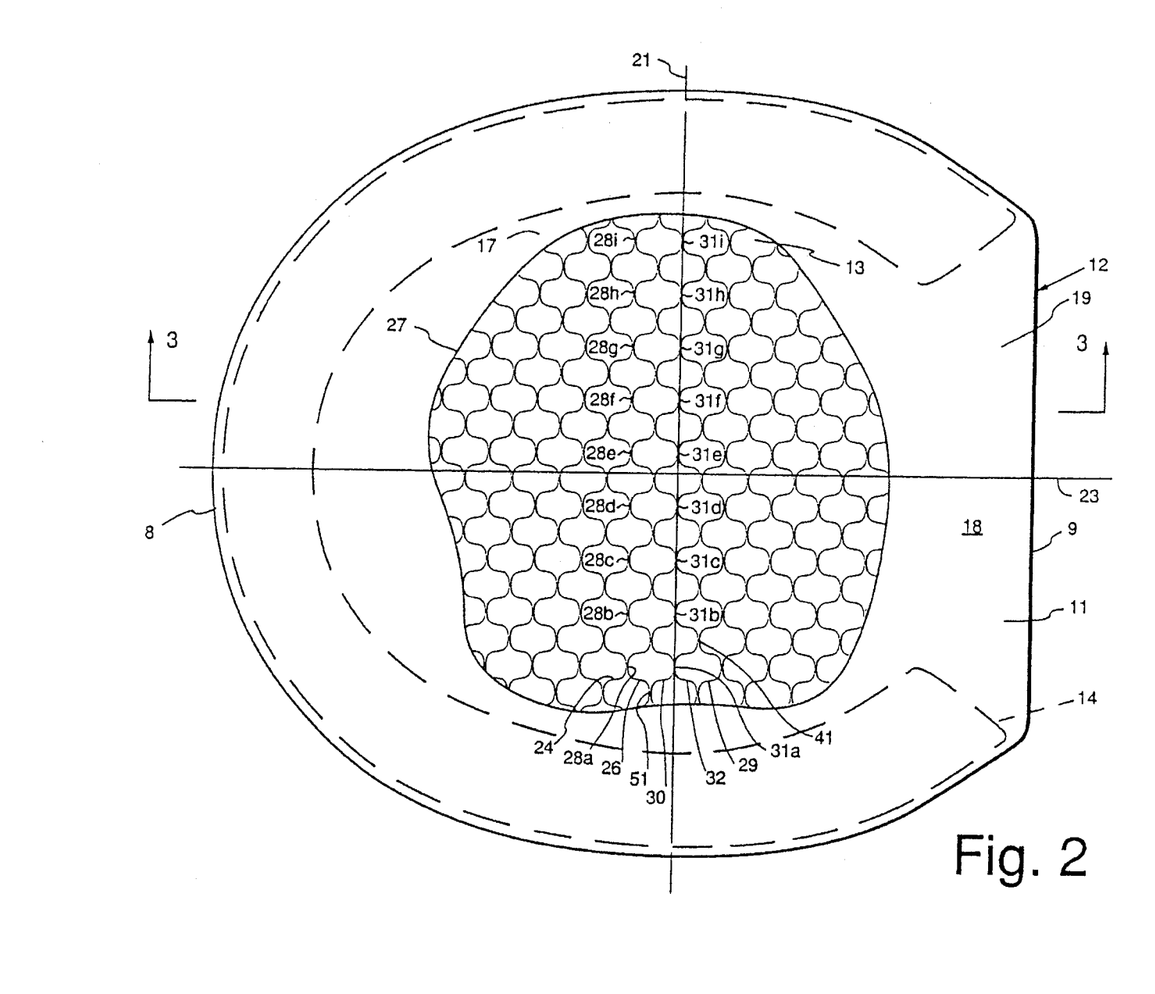
FIG. 2 is a plan view showing the upper or hoof-engaging surface of the full pad of FIG. 1 with a portion of a face sheet cut away to reveal a honeycomb panel.
Figure 3:
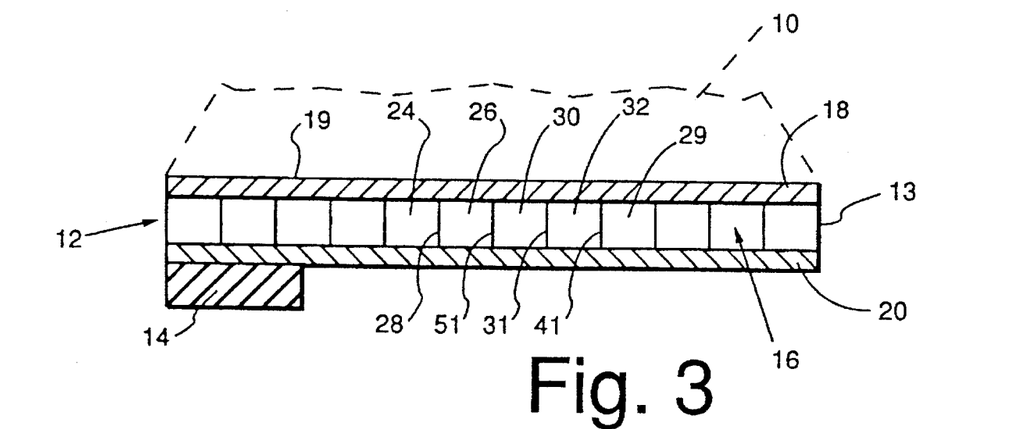
FIG. 3 is a cross-section taken along the line 3—3 in FIG. 2.

In FIGS. 2 and 3 of the drawing, a plan view and a sectional view of the pad 12 are respectively shown. The toe and the heel of the pad 12 are indicated by the numerals 8 and 9, respectively. In FIG. 2, the upper or hoof-engaging surface 11 of the pad is shown with a portion of a hoof-engaging facing sheet 18 cut away at 27 to more clearly reveal a honeycomb panel 13. In accordance with the preferred embodiment of the present invention, the pad 12 includes the resilient honeycomb panel 13 which is of the type described in U.S. Pat. No. 5,039,567 to Landi et al., and includes an expanded core 16 having bonded to the upper and lower surfaces thereof, the facing sheet 18 and a turf-engaging (or horseshoe-engaging) facing sheet 20, respectively. The core 16 is preferably made of ribbons intermittently bonded together and then expanded as disclosed in Landi et al. '567 to form a cellular honeycomb structure. For example, ribbons 24 and 26 are partially illustrated, and are bonded together along a plurality of bond joints, 28a–28i. Similarly, partially illustrated ribbons 29 and 32 are bonded together along a plurality of bond joints 41, and ribbons 30 and 26 are bonded together along bond joints 51.

Each of the ribbons of the panel 13 is disposed substantially perpendicular to the longitudinal axis 23 of the pad 12. More specifically, bond joints formed between adjacent pairs of ribbons define a bond row which is substantially perpendicular to the longitudinal axis 23. For example, bond joints 31a–31i formed between adjacent ribbons 30 and 32 define a bond row 21 which is perpendicular to the longitudinal axis 23.

Each of the ribbons, of a honeycomb panel of a pad, may be constructed from resilient materials having a different durometer value. Generally, the higher durometer value the stiffer the material. The durometer value of the material of the ribbon 30, for example, may be different from the durometer value of the material of the ribbon 32. Since each ribbon, of a panel of a pad, is disposed substantially perpendicular to the longitudinal axis 23, a pad of the present invention can include two or more regions having different stiffness wherein each region is juxtaposed longitudinally in the pad.

In a preferred embodiment illustrated in FIG. 2, for example, the panel 13 of the pad 12 includes a toe region 17 and a heel region 19 which are joined together along an interface that includes a plurality of bond joints. Each of the ribbons in the toe region 17 has identical durometer values, while each of the ribbons in the heel region 19 has identical durometer values. The durometer value of the ribbons in the heel region 19 is different than the durometer value of the ribbons in the toe region 17, i.e. the heel region 19 is stiffer than the toe region 17. Typically, the durometer of the ribbons in the heel region 19 is higher than the durometer of the ribbons in the toe region 17. Although an interface between regions can be formed between any adjacent pair of ribbons, for illustrative purposes only, the interface between the toe and heel regions 17 and 19 is formed by the bond joint 31; that is, the durometer value of the material of ribbon 32 is higher than the durometer value of the material of ribbon 30, and the row 21 is the boundary between the regions 17 and 19.

The pad 12 of the present invention is significantly different from the pad described in Landi et al. '878. In Landi et al. '878, the elastomeric ribbons are disposed substantially parallel to the longitudinal axis of the pad. More importantly, Landi et al. '878 does not disclose a pad having elastomeric ribbons of different durometer. Further, the pad disclosed Landi et al. '878, does not provide different regions of stiffness disposed longitudinally along the pad. In contrast, the pad 12 of the present invention provides a horseshoe pad that can have regions of different stiffness disposed longitudinally along the pad 12. Thus, the pad 12 can be made stiffer in the heel region than in the toe region.

This is a significant improvement over prior art pads because it is known that as a horse gallops, its hoof experiences a heel-toe impact sequence. That is, the heel portion of a hoof experiences the initial and greater impact force than does the toe portion of the hoof. A horseshoe pad of the present invention can, therefore, have greater shock absorption capability in the heel region where it is most beneficial.

The panel 13, of the pad 12, is an anisotropic 3-dimensional structure having predetermined degrees of flex along its orthogonal X, Y, and Z axes. Each cell is formed in part by four generally S-shaped wall segments each of which is shared with an adjacent cell. In addition, each airtight cell shares double thickness wall segments (e.g. the bond joint 28, 31, 41, 51) with two adjacent cells.

The panel 13, of the pad 12, has high tear and tensile strength and is highly resilient, with optimal compression load and shock absorption or disbursing characteristics, yet is extremely lightweight. Selected combinations of elastomeric material, honeycomb cell configuration, core thickness and facing material variables will determine the panel's characteristics of softness or hardness, resilient recovery rate and rigidity or flex as required for a particular application. The facing materials can be selected from a wide variety of films.

In a panel, as an example and not as a limitation, the ribbon stock in the toe region 17 is a 90 Shore A durometer, and is approximately 20 mils thick. The ribbon stock in the heel region is 95 Shore A durometer, and is approximately 14 mils thick. The cell diameter in both the toe and heel regions is 0.125 inches. The hoof-engaging facing sheet is approximately 20 mils thick, and is a 85 Shore A durometer. The turf-engaging (or horseshoe engaging) facing sheet is approximately 40 mils thick and made from material of 90 Shore A durometer. Typically, the overall pad thickness is approximately 0.195–0.200 inches.

Figure 4:
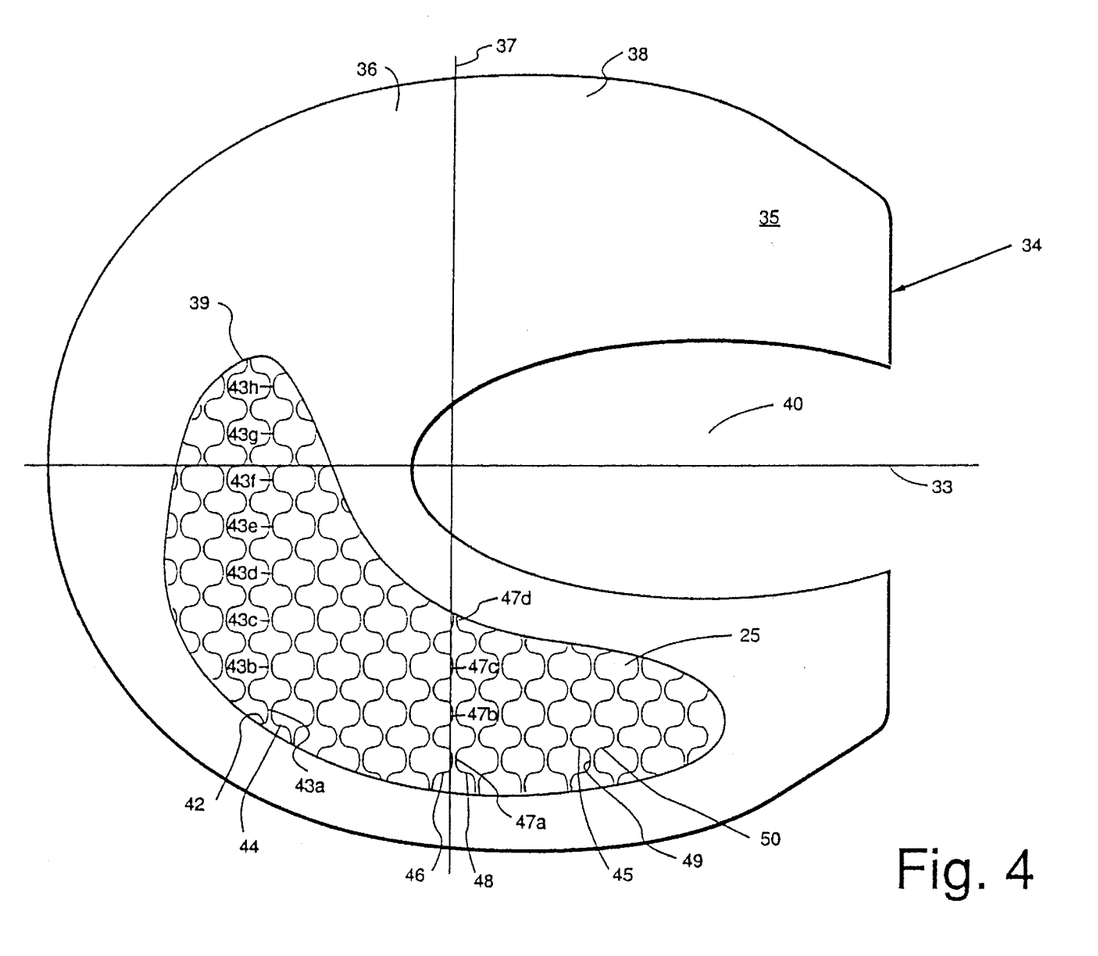
FIG. 4 is a plan view illustrating the lower or turf-engaging surface of an alternative horseshoe pad embodiment in accordance with the present invention with a portion of a face sheet cut away to reveal a honeycomb panel.

FIG. 4 illustrates a plan view of an alternative embodiment of the horseshoe pad of the present invention. A plan view of the lower or turf-engaging surface of a horseshoe pad 34 is shown. The pad 34 is generally similar to the pad 12 (FIG. 2), and includes a honeycomb panel 25 sandwiched between two facing sheets (only one facing sheet is partially shown). As illustrated, a portion of a turf-engaging (or horseshoe-engaging) facing sheet 35 is cut away at 39 to more clearly show the panel 25.

The panel 25, of the pad 34, includes partially shown resilient ribbons 42 and 44 which are bonded together along a plurality of bond joints 43a–43h. Similarly, partially illustrated ribbons 45 and 50 are bonded along a plurality of bond joints 49, and ribbons 46 and 48 are bonded along bond joints 47a–47d. It will be appreciated that each of the ribbons of the panel 25 is disposed substantially perpendicular to the longitudinal axis 33 of the panel 25. More specifically, bond joints formed between adjacent pairs of ribbons define a bond row which is substantially perpendicular to the longitudinal axis 33. For example, bond joints 47a–47d formed between adjacent ribbons 46 and 48 define a bond row 37 which is substantially perpendicular to the longitudinal axis 33.

As with the pad 12 (FIG. 2), each of the ribbons of panel 25 of the pad 34 may be constructed from resilient materials having a different durometer value. The pad 34 can have two or more regions of different stiffness, wherein these regions are juxtaposed longitudinally along the pad. As shown, the pad 34 has a toe region 36 and a heel region 38. Each of the ribbons of the heel region 38 is made from a thermoplastic material having a durometer value different than the durometer value of the material of each of the ribbons of the toe region 36. Typically, however, the heel region 38 is stiffer than the toe region 36. Although the interface between the toe and the heel regions can be formed at a bond joint between any adjacent pair of ribbons, for illustrative purposes only, the interface between the toe and heel regions is formed by bond joints 47a–47d, i.e. along the bond row 37. In the typical case, the heel region 38 has greater shock absorption capability than the toe region 36, and the pad 34 can better accommodate the heel-toe impact sequence experienced by a horse.

The pad 34 is different from the pad 12 (FIG. 2) because it has a portion removed (see the area labeled with a reference numeral 40) from the heel region 38. The pad 34 can, therefore, be constructed of lesser material and be of lighter weight than the full pad 12, and used in applications where weight is a significant consideration.

Figure 5:
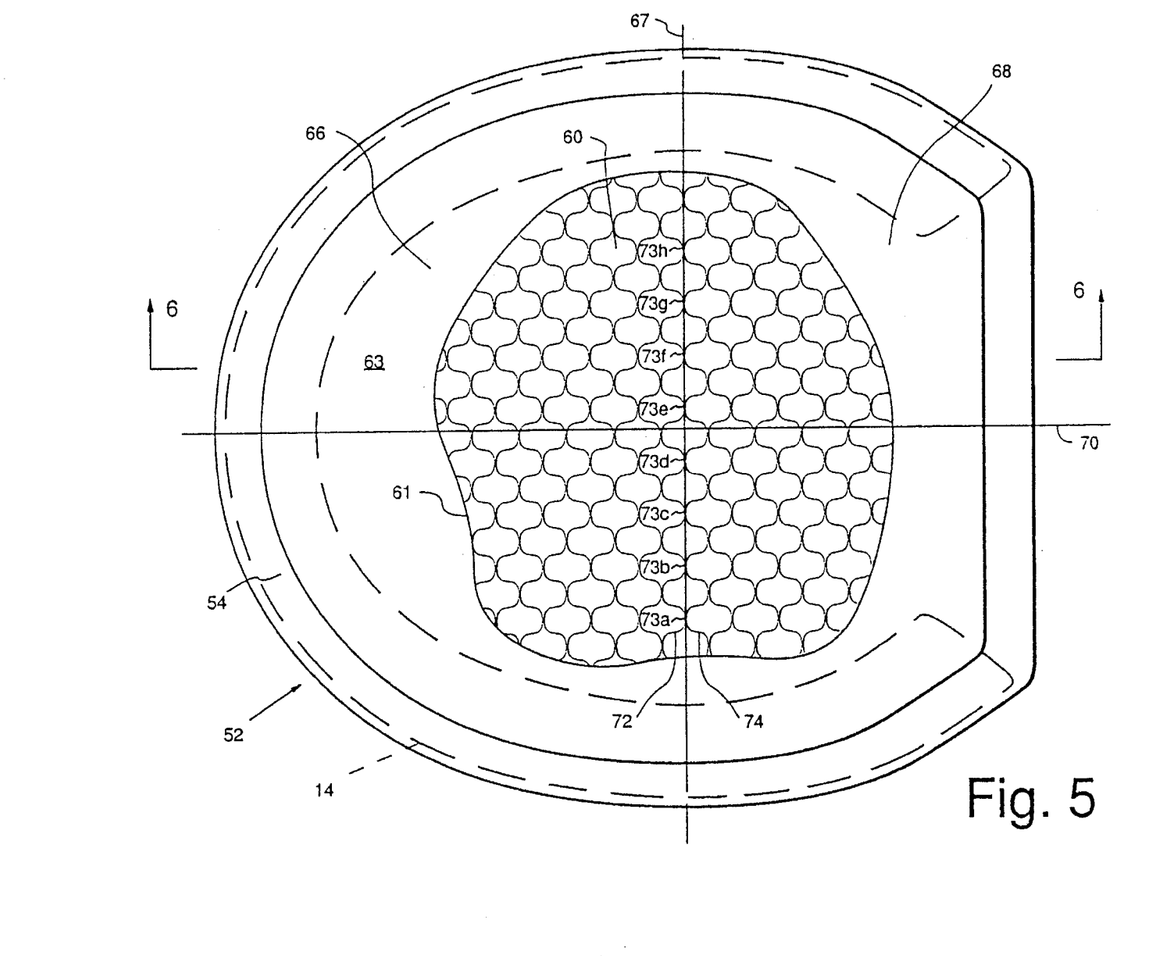
FIG. 5 is a plan view depicting the hoof-engaging surface of another alternative horseshoe pad embodiment in accordance with the present invention with a portion of a face sheet cut away to reveal a honeycomb panel.
Figures 6, 7:
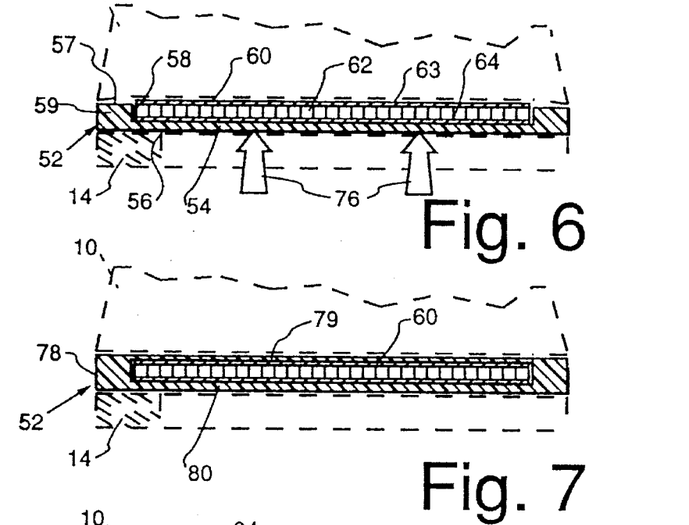
FIG. 6 is a cross-section taken along the line 6—6 in FIG. 5.
FIG. 7 is a cross-section similar to that of FIG. 6, but showing still another alternative horseshoe pad embodiment of the present invention.

In FIGS. 5 and 6 of the drawing, a plan and a sectional view of another alternative embodiment of a horseshoe pad 52 are respectively shown. In this embodiment the pad 52 includes a honeycomb panel 60 attached to a urethane base 54. The base 54 is cast from a thermoset, urethane of 95 Shore A durometer, and its outer perimeter generally conforms to a particular type and size of horse hoof or horseshoe.

The base 54 includes a planar bottom, or turf-engaging (or horseshoe-engaging) surface 56 and an upper or hoof-engaging surface 57 having a cavity or recess 58 formed therein leaving an upstanding perimeter rim 59. The base is typically 0.188 inch thick with a cavity or recess depth of 0.125 inch. The width of rim 59 is approximately 0.250 inch all around, but could be of any desired width. For example, the rim might be as wide as the horseshoe width.

Disposed within the recess 58 is the resilient honeycomb panel 60 which is of a type similar to panels 13 and 25 (FIGS. 2–4) and includes an expanded core 62 having bonded to the upper and lower surfaces thereof, facing sheets 63 and 64, respectively. The panel 60 is adhesively secured to the cast urethane base 54 with a suitable urethane adhesive.

The pad 52 has a longitudinal axis 70 associated therewith. A portion of the facing sheet 63 is cut away at 61 to illustrate the panel 60 which is made of ribbons intermittently bonded together and then expanded as disclosed above to form a cellular honeycomb structure. For example, adjacent ribbons 72, 74 are bonded together along a plurality of bond joints 73a–73h to define a bond row 67 which is substantially perpendicular to the longitudinal axis 70.

The pad 52 includes a toe region 66, and a heel region 68 which are generally similar to the regions 17 and 19 of pad 12 (FIG. 2), and regions 36 and 38 of pad 34 (FIG. 4). The heel region 68 is significantly stiffer than the toe region 66 such that the pad 52 provides greater shock absorption for the heel-toe impact sequence experienced during the gait of the horse. The interface between the regions 66 and 68 is depicted, for illustrative purposes only, as being along bond joints 73, i.e. along the bond row 67. However, as with the other pads 12 and 34, the depiction of the location of the interface between the toe and the heel regions of the pad 52 is arbitrary and the location could have been illustrated at some other bond joint.

It will be appreciated by those skilled in the art that although a pad (i.e. 12, 34, or 52) absorbs a portion of the shock transmitted from the shoe 14 to the hoof 10, its principal function is to absorb and spread the forces shown generally by the arrows 76 and normally experienced by the otherwise unprotected central portion of the hoof. For example, on surfaces soft or displaceable enough to be penetrated by the horseshoe, a large percentage of the impact load will be borne by the portion of the hoof not covered by the shoe. The subject pad is designed to absorb a substantial portion of such impact load. In addition, a pad will protect against bruises and lacerations caused by rocks, pebbles and other objects upon which the horse may step.

FIGS. 7–10 are cross-section views illustrating alternative embodiments of the pad 52 (FIGS. 5–6).

FIG. 7 is a cross-section view similar to that of FIG. 6 showing the honeycomb panel 60 disposed completely within and enveloped by a cast urethane base 78. The thicknesses of the upper and lower covering layers 79 and 80 are selected to fit the particular application.

Figure 8:
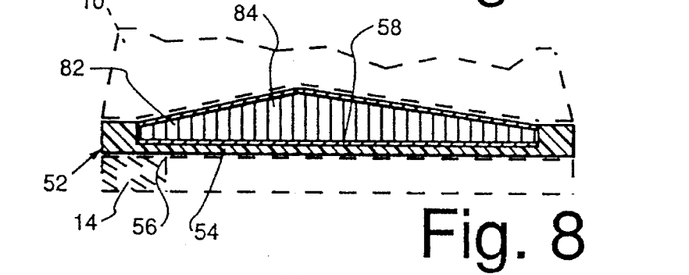
FIGS. 8–10 are cross-sections similar to that of FIG. 6, but illustrating the inclusion of frog pads, stabilizer ribs, heel shock-reducers, and a wedge base in accordance with the present invention.

FIG. 8 depicts a modified pad 52 including a honeycomb panel 82 having a humped portion 84 which is thicker at the pad midsection and tapers toward the front and rear of the pad. The thickness of the hump may be uniform in the transverse direction or laterally tapered. In the embodiment of FIG. 8, the entire frog-engaging surface is formed by the shaped honeycomb panel 82.

Figure 9:
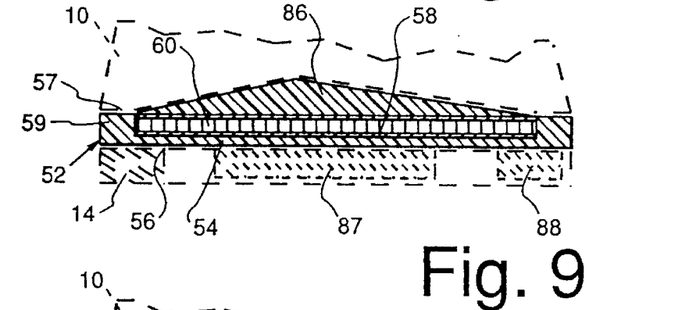

FIG. 9 shows the pad 52 formed by affixing a molded urethane member 86 to the upper surface of the honeycomb panel 60 (FIG. 5, 6) disposed within the recess 58 formed in the base 54. In addition, molded or preformed cleats and/or longitudinal stabilizer bars 87 and raised heel pads 88 can be provided integral with or affixed to the bottom side of base 54. The frog pad will of course be of a shape and thickness determined by the size and breed of horse being shod, and will usually be designed to both protect the frog and stimulate and increase vascular circulation.

Figure 10:
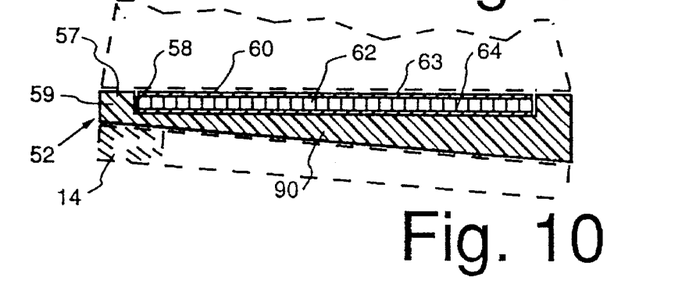

FIG. 10 illustrates a "wedge pad" variation of the pad 52 wherein a wedge base 90 is tapered from toe to heel so as to provide a predetermined tilt to the animal hoof when the pad 52 is installed.

Figure 11:
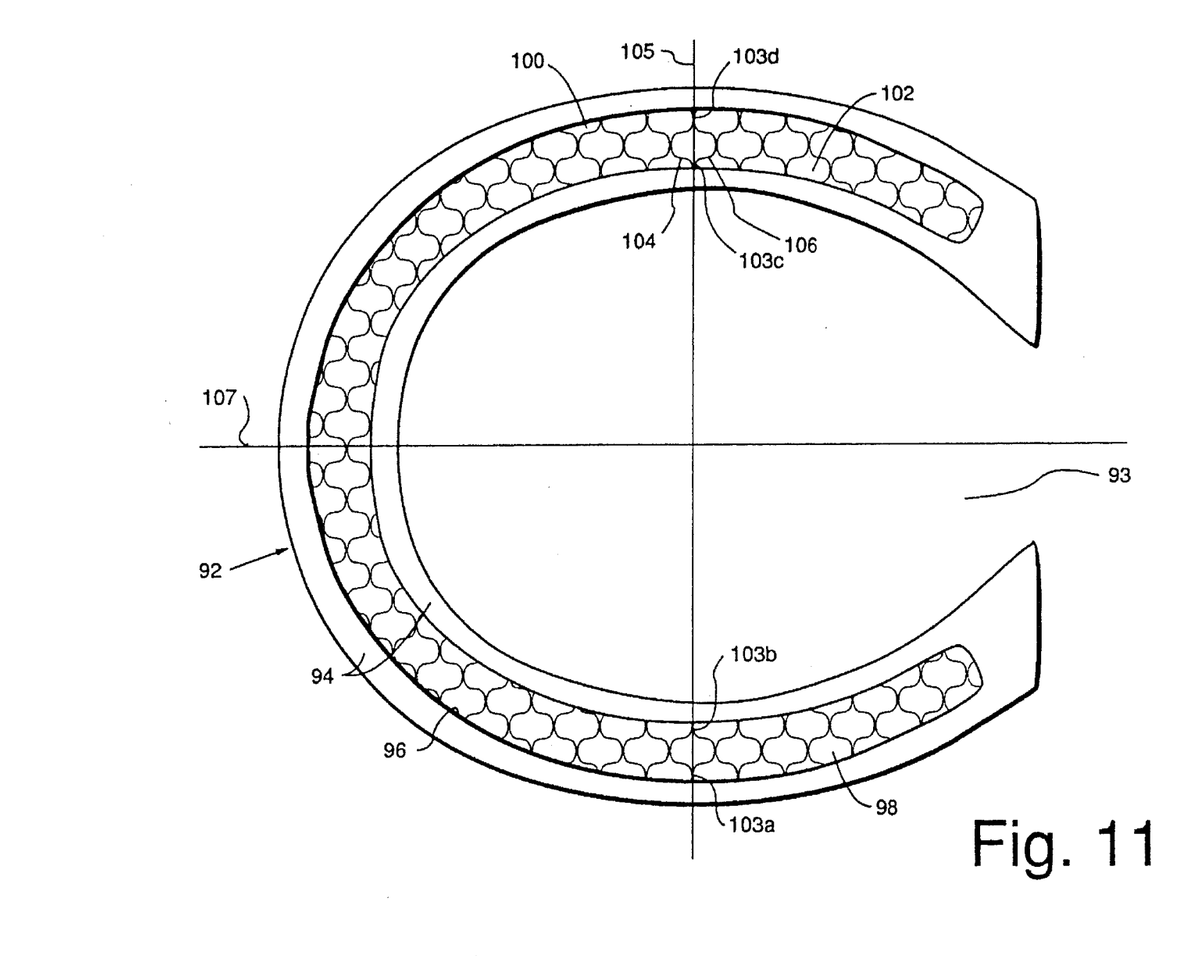
FIG. 11 is a plan view showing a racing style horseshoe pad alternative embodiment in accordance with the present invention.

FIG. 11, illustrates yet another alternative pad 92, configured particularly for racing applications, which is similar in construction to the previously described pads 12, 34, 52 (FIGS. 1–10), except that, as indicated at 93, a central region of the pad 92 is removed, and the "footprint" of the pad 92 corresponds generally to the plan form of a horseshoe. A perimeter rim 94 bordering the entire pad and defining a recess 96 into which the generally U-shaped honeycomb panel 98 is positioned and affixed. In this particular application the intent is to limit movement of the shoe relative to hoof to a minimum while at the same time absorbing shock forces which are normally transmitted to the hoof.

The honeycomb panel 98, of the pad 92, is generally similar to the panels 13, 25, and 60 (FIGS. 2, 4, 5) and is shown without a facing sheet in order to more clearly illustrate the ribbon structure therein. The panel 98 is formed from ribbon stock which is intermittently bonded and then expanded as disclosed above. For example, similar to the panels 13, 25 and 60 (FIG. 2–5), bond joints 103a–103d are formed between adjacent elastomeric ribbons 104 and 106 to define a bond row 105 which is substantially perpendicular to a longitudinal axis 107. The interface between a toe region 100 and a heel region 102 can be along any bond joint. In the illustrated embodiment, the interfaces between the regions 100 and 102 are along the row 105. Therefore, as with the panels 13, 25, and 60, stiffness can be varied longitudinally along the pad 92.

Figure 12:
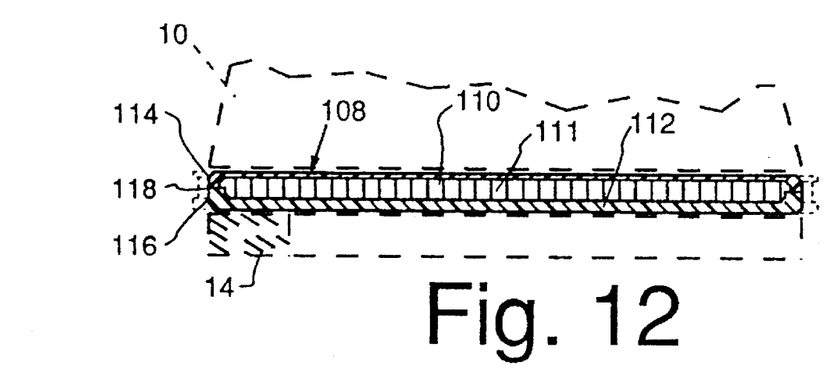
FIGS. 12 and 13 are cross-sections similar to that of FIG. 6, showing yet further alternative embodiments of the present invention.
Figure 13:
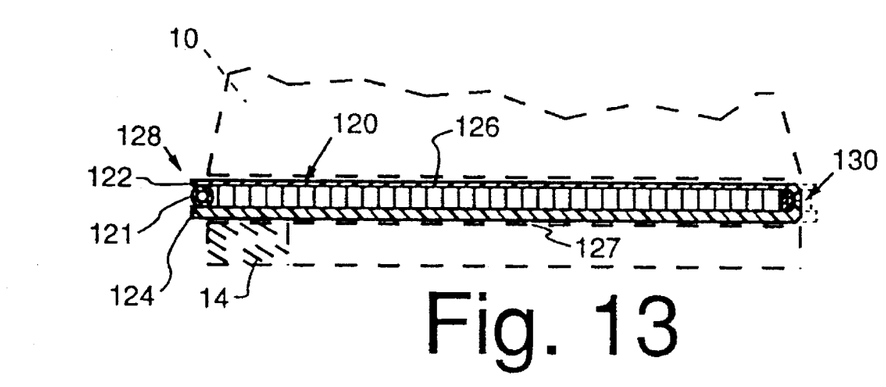

FIGS. 12 and 13 depict alternative pad embodiments 108, 120 along with two methods of providing edge treatment to the pads. As with the pads 12 and 34, pads 108 and 120 do not use a separate base. As illustrated, a pad 108 is comprised of a honeycomb panel 110 made in the same way as the honeycomb panels 13, 25 and 60 (FIG. 2–6), or 98 (FIG. 11) except that the expanded core 111 is approximately 0.100 inch thick and the thickness of a bottom facing 112 is increased to 0.40 inch or greater.

In order to close the core edges, two methods are illustrated. As suggested in FIG. 12, closure may be accomplished by using a heating iron (not shown) having a temperature sufficient to first soften and collapse the two edges 114 and 116 inwardly, and then melt and fuse the edges together at a fused joint 118. The fused perimeter would then be trimmed flush with hoof and shoe as described above.

Alternatively, as depicted in the pad 120 in FIG. 13, a tube 121 of 1/16 inch diameter (O.D.) thermoplastic urethane (TPU) may be wrapped about the perimeter of the pad 120 and positioned between edges 122 and 124 of the upper and lower facing sheets 126 and 127 as indicted at 128. Alternatively, a solid strip of TPU could be used. The edge would then be thermally sealed by using a heating iron (not shown) or the like to thermally collapse and bond the edges and tube as indicated at 130. If needed, the fused edge could then be trimmed or filed to conform to the hoof/shoe edge profile as desired.

Figure 14:
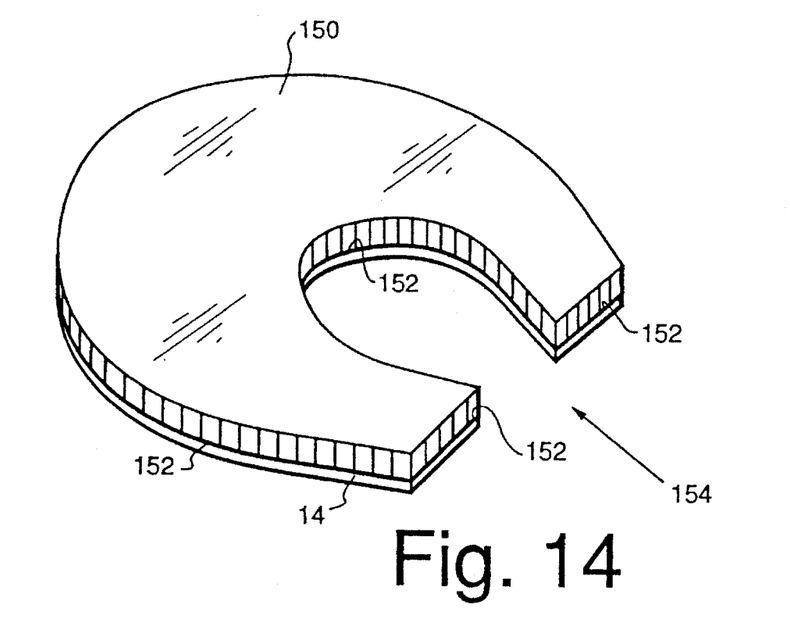
FIG. 14 is a plan view showing the upper or hoof-engaging surface of an alternative embodiment of the full pad of FIG. 2 with a portion of a face sheet cut away to reveal an alternative honeycomb panel.

FIG. 14 of the drawing illustrates a plan view of a pad 140 which is an alternative embodiment of the pad 12 (FIG. 2). The toe and the heel of the pad 140 are indicated by the numerals 142 and 144, respectively. A longitudinal axis 146, of the pad 140, is disposed as illustrated. An upper or hoof-engaging surface 148 of the pad is shown with a portion of a hoof-engaging facing sheet 150 cut away at 149 to more clearly reveal a honeycomb panel 152.

In accordance with this alternative embodiment, the panel 152 is of a type generally similar to the panel 13 (FIG. 2, 3), and includes a core 154 having bonded to the upper and lower surfaces thereof, the facing sheet 150 and a turf-engaging (or horseshoe-engaging) facing sheet (not shown), respectively. The core 154 is preferably made of ribbons intermittently bonded together and then expanded as disclosed in Landi et al. '567 to form a cellular honeycomb structure. For example, ribbons 156 and 158 are partially illustrated, and are bonded together along a plurality of bond joints, e.g. joints 157a–157h. Similarly, partially illustrated ribbons 160 is 162 are bonded together along a plurality of bond joints, e.g. joints 161a–161h.

Each of the ribbons of the panel 152 is disposed substantially parallel to the longitudinal axis 146. More specifically, the bond joints formed between adjacent ribbons define a bond row which is substantially parallel to the longitudinal axis 146. For example, bond joints 157a–157h formed between adjacent ribbons 156 and 158 define a bond row which is parallel to the longitudinal axis 146. Similarly, a bond row 163 is defined by the bonds 161a–161h formed between adjacent ribbons 160 and 162, and is substantially parallel to the row 159.

As in pad 12 (FIG. 2), each of the ribbons of the honeycomb panel 152 of the pad 140 may be constructed from resilient materials having a different durometer value. Since each ribbon of the panel 152 of the pad 140 is disposed generally parallel to the longitudinal axis 146, it will be appreciated, that the stiffness of the pad 140 can vary transversely across the pad 140.

In the illustrated embodiment, the panel 152 of the pad 140 includes three regions 164, 166, and 168. Each of the ribbons in a region has identical durometer values. Although three regions are shown, it will be appreciated that the pad 140 may have only two regions, or more than three regions. Also, although regions 164 and 166 are joined along bond row 159, and regions 166 and 168 are joined along bond row 163, it will be appreciated that an interface between adjacent regions can be along any bond row, and the size of a region is not limited to the sizes depicted for regions 164, 166, and 168.

The pad 140 is significantly different from the pad described in Landi et al. '878. In Landi et al. '878, the elastomeric ribbons are disposed in a generally longitudinal direction, and the bond joints formed between adjacent ribbons define a bond row that is parallel to a longitudinal axis. However, Landi '878 does not disclose a pad wherein the ribbons are of different durometer. In contrast, the pad 150 provides a horseshoe pad that includes ribbons having different durometer characteristics.

The pad 140 can, therefore, be made stiffer along its inner lateral edge (e.g. the region 164) with respect to other areas of the pad. The pad 140, therefore, provides a greater support and stability for the inner lateral portion of a horse's hoof which may be particularly useful as a horse performs sharp turning maneuvers at high speeds.

As another example, the ribbon in the regions 164 and 168 of the pad 140 can be made from material having a significantly higher durometer than the material of the ribbons in the region 166. In this configuration, the horse hoof can be "cradled" between two stiff regions thereby providing greater stability and motion control during the gait of the horse.

Figure 15:
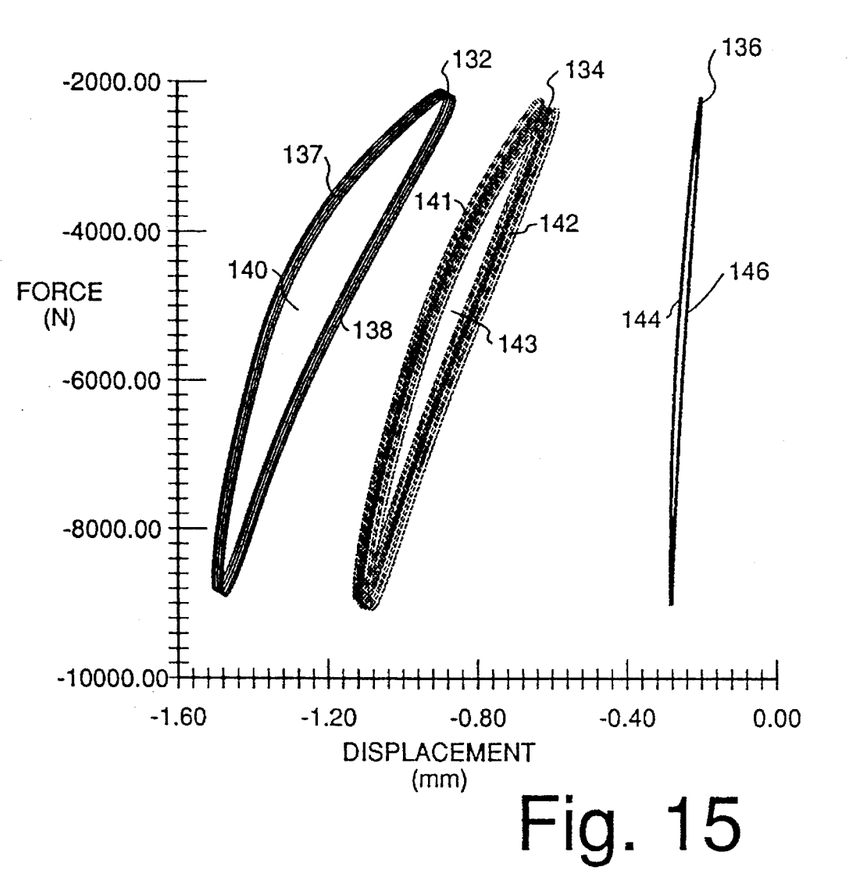
FIG. 15 is a plan view showing the upper or hoof-engaging surface of yet another alternative embodiment of the full pad of FIG. 2 with a portion of a face sheet cut away to reveal another honeycomb panel having a plurality of different cell sizes.

FIG. 15 of the drawing illustrates a plan view of a pad 170 which is an alternative embodiment of the pad 12 (FIG. 2). The toe and the heel of the pad 180 are indicated by the numerals 171, and 172, respectively. An upper or hoof-engaging surface 174 of the pad 170 is shown with a portion of a hoof-engaging facing sheet 176 cut away at 177 to more clearly reveal a honeycomb panel 178.

In accordance with this alternative embodiment, the panel 178 is of the type generally similar to the panel 13 (FIGS. 2, 3), and includes an expanded core 180 having bonded to the upper and lower surfaces thereof, the facing sheet 176 and a turf-engaging (or horseshoe-engaging) facing sheet (not shown), respectively. The core 180 is preferably made of ribbons intermittently bonded together and then expanded as disclosed in Landi et al. '567 to form a cellular honeycomb structure. For example, ribbons 182 and 184 are partially illustrated, and are bonded together along a plurality of bond joints, e.g. joints 183*a*–183*k*. Similarly, partially illustrated ribbons 186 and 188 are bonded together along a plurality of bond joints 187*a*–187*j*.

Each of the ribbons of the panel 178 is disposed substantially parallel to a longitudinal axis 173 of the pad 180. More specifically, bond joints formed between adjacent pairs of ribbons define a bond axis which is substantially parallel to the longitudinal axis 173. For example, bond joints 183*a*–183*k* formed between adjacent ribbons 182 and 184 define a bond row 190 which is substantially parallel to the longitudinal axis 173. Similarly, a bond row 192 is defined by the bonds 187*a*–187*j* formed between adjacent ribbons 186 and 188, and is substantially parallel to the axis 173.

As in pad 140 (FIG. 14), each of the ribbons of the honeycomb panel 178 of the pad 176 may be constructed from resilient materials having a different durometer value. Since each ribbon is disposed generally parallel to the longitudinal axis 173, it will be appreciated that the stiffness of the pad 170 can vary transversely across the pad 150.

In the alternative embodiment illustrated in FIG. 15, the panel 178 of the pad 176 includes cells of different sizes. The panel 178 includes cells of two different sizes. Cells 194 are generally identical in size to cells 196. Cells 198 are substantially larger than cells 194 and 196.

The larger cells 198 of the panel 178 provide a central region that is softer than regions of the similar sized cells 194 and 196. This allows the hoof to be "cradled" between the two stiffer regions of the cells 194, 196.

The panel 178 of the pad 170 is substantially similar in structure to the panel 13 of the pad 12. The panel 178 of the pad 170 is also a high tear and tensile strength and is highly resilient, with optimal compression load and shock absorption or disbursing characteristics, yet is extremely lightweight.

Selected combinations of elastomeric material, honeycomb cell configuration, core thickness and facing material variables will determine the panel's characteristics of softness or hardness, resilient recovery rate and rigidity or flex as required for a particular application. The facing materials can be selected from a wide variety of films.

The materials used and the cell sizes, ribbon thickness, facing sheet thickness of the panel 178 of the pad 170 are generally similar to the materials and dimensions of the panel 13 of the pad 12.

Figure 16:
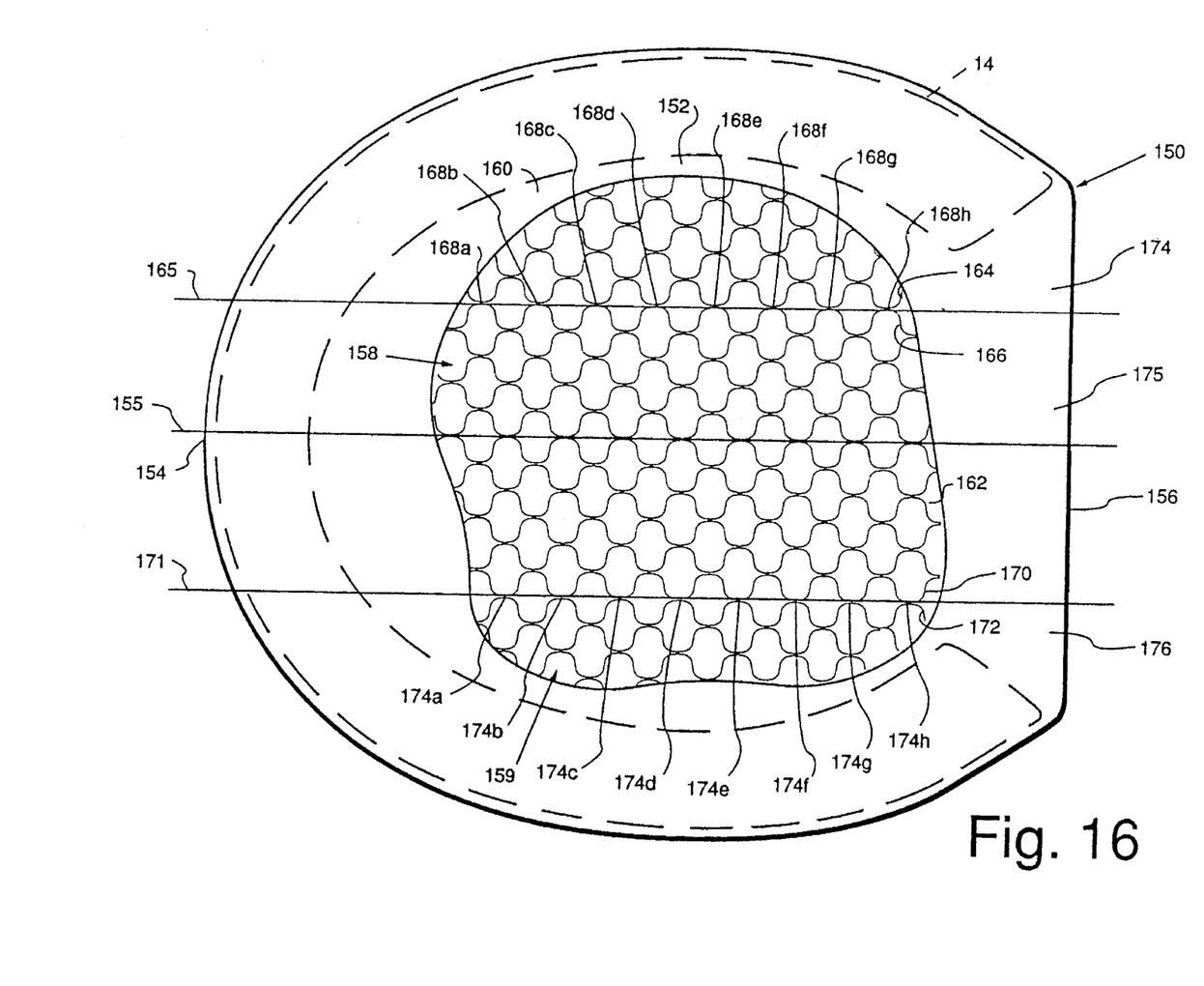
FIG. 16 is a perspective view showing a horseshoe pad of the present invention welded or thermal compression bonded to a metal horseshoe.

FIG. 16 is a perspective view illustrating a horseshoe pad 200 of the present invention attached to the metal horseshoe 14. The pad 200 is substantially similar to any of the pads previously disclosed. A lower or turf-engaging surface 204 of the pad 200 is welded or thermal compression bonded to the metal horseshoe 14 to form a prefabricated (i.e. preassembled) horseshoe assembly 202.

As a further alternative, an oversize honeycomb panel with or without finished border could be installed between the hoof and shoe of a horse, with the selvage being thermally deformed inwardly in situ, by the careful application of heat, to provide a smooth bordering surface spanning the space between the outer perimeter of the horseshoe and the hoof and occupied by the pad.

Figure 17:
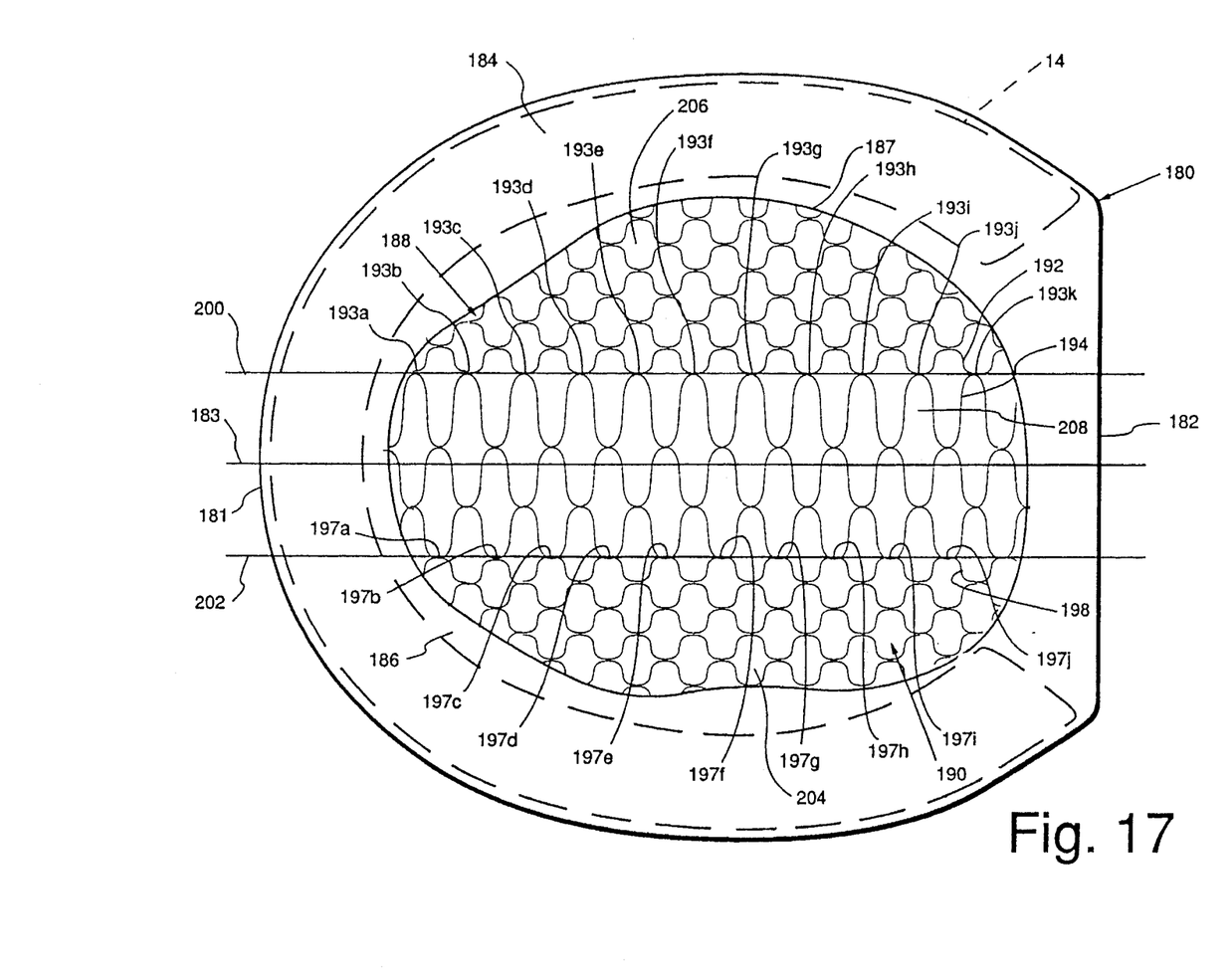
FIG. 17 depicts hysteresis loops for horseshoe pads constructed from different materials.

FIG. 17 illustrates three hysteresis loops 204, 206, and 208 for tested specimens of horseshoe pads manufactured from different materials. Loop 204 represents a horseshoe pad of the present invention. Loops 206 and 208 represent prior art horseshoe pad specimens.

Each loop indicates the amount of force transmitted to the hoof as the pad is compressed. In real life, this might equate to the situation of a horse stepping on a surface irregularity, such as a rock, that locally compresses the pad. The upper curve of a loop indicates the resistance to loading established by the specimen, while the lower curve illustrates the response of the specimen as it is unloaded. That is, a lower curve depicts how the tested material springs back when the loading force is removed. The area bounded between the upper and the lower curves for a specimen is called a hysteresis loop and shows the amount of energy absorbed by the specimen during the test.

As shown, in loop 204 (i.e. the applicants' horseshoe pad) the area 212, bounded by the upper curve 214 and the lower curve 216, of the loop 204 is significantly larger than the area 218, bounded by the upper curve 220 and the lower curve 222, of the loop 206. Also, the loop 208 absorbs virtually no energy since there is very little area 228 bounded between the curves 224 and 226. Therefore, the amount of energy absorbed by a pad of the present invention is significantly larger than the energy absorbed by materials of prior art specimens.

These graphs indicate that the prior art pads essentially bottom out when they are initially compressed (i.e. they provide very little shock isolation for the hoof). However, in the pad of the present invention, due to the air spring effect of cellular network, as the honeycomb starts to bottom out, the pad of the present invention provides a rising rate cushion as it nears the end of its compressive strain capability. This effect is more gradual and offers more protection to the hoof than the characteristics of the conventional pad if the load is high enough to compress the pad that far. It should be apparent, therefore, that the present invention offers material improvement over the prior art pads.

Although the present invention has been described above in terms of a specific embodiment, it is anticipated that alterations and modifications thereof will no doubt become apparent to those skilled in the art. For example, any or all of the above described features could be cast into an integral base enveloping one or more honeycomb panels. It is therefore intended that the following claims be interpreted as covering all such alterations and modifications as fall within the true spirit and scope of the invention.

We claim:

1. A shock-absorbing impact pad for horses, comprising:
  a) a first facing sheet of resilient material;
  b) a second facing sheet of resilient material; and
  c) a generally oval-shaped panel being truncated along one end to have an outer perimeter configured to correspond to the hoofprint of a horse, said panel being made of a resilient material and including a honeycomb-configured core having
    i) a plurality of strips of resilient thermoplastic material being bonded together such that the bonds between adjacent strips are at regular intervals and form bond rows regularly spaced in the direction transverse to said bond rows, with the bonds in a bond row being longitudinally offset relative to the bonds in an adjacent bond row, said strips forming cell walls defining a plurality of strips of contiguous regular shaped cells, said core having a first face formed by a first extremity of said cell walls and a second face formed by a second extremity of said cell walls, said first face being bonded to said first facing sheet, and said second face being bonded to said second facing sheet,
    ii) said core comprising a first region and at least one other region, said first region of said core having a plurality of strips of thermoplastic material having a first stiffness characteristic, said other region of said core having a plurality of strips of thermoplastic material having a second stiffness characteristic, and
    iii) whereby when placed between a horseshoe and horse's hoof the pad tends to absorb a substantial part of the shock energy that would otherwise be transmitted to the hoof.

2. A shock-absorbing impact pad as recited in claim 1 wherein
  a) each of said bond rows in each of said first and said other regions, is dispursed parallel to each other and parallel to the longitudinal axis of said panel.

3. A shock-absorbing impact pad as recited in claim 2 further comprising:
  a generally oval-shaped base truncated on one side to have an outer perimeter configured to correspond to the hoofprint of a horse, said base being made of a resilient material and having secured thereto said panel.

4. A shock-absorbing impact pad as recited in claim 3 wherein said base includes a recess formed on the hoof-facing side thereof and wherein said panel is disposed within said recess and is bonded thereto.

5. A shock-absorbing impact pad as recited in claim 3 wherein said panel is fully enveloped within said base.

6. A shock-absorbing impact pad as recited in claim 3 and further comprising frog-engaging means formed on the hoof-facing side of said pad.

7. A shock-absorbing impact pad as recited in claim 6 wherein said frog-engaging means is formed by a shaped outer surface of said panel.

8. A shock-absorbing impact pad as recited in claim 6 wherein said frog-engaging means is comprised of a shaped resilient member affixed to the hoof-facing side of said panel.

9. A shock-absorbing impact pad as recited in claim 3 wherein said base is tapered from toe to heel to cause the horse's hoof to tilt forwardly.

10. A shock-absorbing impact pad as recited in claim 3 wherein said base is provided with elongated stabilizing ribs disposed on the turf-engaging face of said base in the region to be partially encircled by the horseshoe.

11. A shock-absorbing impact pad as recited in claim 3 wherein said base includes raised heel pads disposed in the portion of said base lying between the open ends of a horseshoe affixed thereto.

12. A shock-absorbing impact pad as recited in claim 2 wherein said second sheet is thermal compression bonded to said horseshoe.

13. A shock-absorbing impact pad as recited in claim 2 wherein said first region is disposed in a toe region of a horse hoof, and said other region is disposed in a heel region of said hoof, said second stiffness characteristic being greater than said first stiffness characteristic.

14. A shock-absorbing impact pad as recited in claim 2 wherein the bordering edges of said first and second sheet are deformed inwardly toward each other and are fused together to provide a closed perimeter of substantially uniform thickness around a plan form corresponding substantially to the footprint of a horseshoe.

15. A shock-absorbing impact pad as recited in claim 14 wherein a strip of plastic material is placed between said bordering edges before they are deformed, and said edges are fused to said strip as they are fused together.

16. A shock-absorbing impact pad as recited in claim 2 wherein the perimeter of said panel is thermally formed in situ to conform to the smooth exterior surface spanning the space between horseshoe and hoof and occupied by said pad.

17. A shock-absorbing impact pad as recited in claim 2 wherein said pad has a plan form corresponding substantially to the footprint of a horseshoe.

18. A shock-absorbing impact pad as recited in claim 17 further comprising:
  a generally oval-shaped base truncated on one side to have an outer perimeter configured to correspond to the hoofprint of a horse, said base being made of a relatively firm, resilient material and having secured thereto said panel.

19. A shock-absorbing impact pad as recited in claim 17 wherein said first region is disposed in a toe region of a horse hoof, and said other region is disposed in a heel region of said hoof, said second stiffness characteristic being greater than said first stiffness characteristic.

20. A shock-absorbing impact pad as recited in claim 17 wherein said second sheet is thermal compression bonded to said horseshoe.

21. A shock-absorbing impact pad as recited in claim 1 wherein a) each of said bond rows in each of said first and said other regions, are disposed parallel to each other and perpendicular to the longitudinal axis of said panel.

22. A shock-absorbing impact pad as recited in claim 21 wherein said second sheet is thermal compression bonded to said horseshoe.

23. A shock-absorbing impact pad as recited in claim 21 wherein said pad has a plan form corresponding substantially to the footprint of a horseshoe.

24. A shock-absorbing impact pad as recited in claim 23 further comprising:
a generally oval-shaped base truncated on one side to have an outer perimeter configured to correspond to the hoofprint of a horse, said base being made of a relatively firm, resilient material and having secured thereto said panel.

25. A shock-absorbing impact pad as recited in claim 23 wherein said second sheet is thermal compression bonded to said horseshoe.

26. A shock-absorbing impact pad for horses, comprising:
a) a first facing sheet of resilient material;
b) a second facing sheet of resilient material; and
c) a generally oval-shaped panel being truncated along one end to have an outer perimeter configured to correspond to the hoofprint of a horse, said panel being made of a resilient material and including a honeycomb-configured core having
i) a plurality of strips of resilient thermoplastic material being bonded together such that the bonds between adjacent strips are at regular intervals and form bond rows regularly spaced in the direction transverse to said bond rows, with the bonds in a bond row being longitudinally offset relative to the bonds in an adjacent bond row, said strips forming cell walls defining a plurality of strips of contiguous regular shaped cells, said core having a first face formed by a first extremity of said cell walls and a second face formed by a second extremity of said cell walls, said first face being bonded to said first facing sheet, and said second face being bonded to said second facing sheet,
ii) said core comprising a first region and at least one other region, said first region of said core having a plurality of cells having a first dimension, said other region of said core having a plurality of cells having a second dimension, and
iii) whereby when placed between a horseshoe and horse's hoof the pad tends to absorb a substantial part of the shock energy that would otherwise be transmitted to the hoof.

* * * * *